(12) United States Patent
Barreto De Miranda Sargento et al.

(10) Patent No.: US 9,717,104 B2
(45) Date of Patent: Jul. 25, 2017

(54) METHOD AND SYSTEM FOR PROVIDING DATA ACCESS TO MOBILE NETWORK NODES OF A DATA NETWORK

(71) Applicants: UNIVERSIDADE DE AVEIRO, Aveiro (PT); INSTITUTO DE TELECOMUNICAÇÕES, Lisboa (PT); VENIAM, UNIPESSOAL LDA., Porto (PT)

(72) Inventors: Susana Isabel Barreto De Miranda Sargento, Ihavo (PT); Diogo Miguel Augusto Lopes, Aveiro (PT); Ricardo Jorge Magalhães De Matos, Vila Real (PT)

(73) Assignees: UNIVERSIDADE DE AVEIRO, Aveiro (PT); INSTITUTO DE TELECOMUNICAÇÕES, Aveiro (PT); VENIAM, UNIPESSOAL LDA, Porto (PT)

( * ) Notice: Subject to any disclaimer, the term of this patent is extended or adjusted under 35 U.S.C. 154(b) by 0 days.

(21) Appl. No.: 15/038,378

(22) PCT Filed: Jun. 24, 2014

(86) PCT No.: PCT/IB2014/062569
§ 371 (c)(1),
(2) Date: May 20, 2016

(87) PCT Pub. No.: WO2015/075569
PCT Pub. Date: May 28, 2015

(65) Prior Publication Data
US 2016/0309524 A1    Oct. 20, 2016

(30) Foreign Application Priority Data

Nov. 22, 2013    (PT) .......................... 107316

(51) Int. Cl.
*H04W 76/02*       (2009.01)
*H04W 8/08*        (2009.01)
(Continued)

(52) U.S. Cl.
CPC ............. *H04W 76/02* (2013.01); *H04W 8/02* (2013.01); *H04W 8/08* (2013.01); *H04W 48/16* (2013.01);
(Continued)

(58) Field of Classification Search
None
See application file for complete search history.

(56) References Cited

U.S. PATENT DOCUMENTS

2011/0032874 A1    2/2011   Kim et al.
2011/0103304 A1*   5/2011   Jeon .................. H04W 36/02
                                                         370/328
2012/0099539 A1    4/2012   Kim et al.

OTHER PUBLICATIONS

Fumio Teraoka et al: "PNEMO: A network-based localized mobility management protocol for mobile networks", Ubiquitous and Future Networks (ICUFN), 2011 Third International Conference on, IEEE, Jun. 15, 2011 (Jun. 15, 2011). pp. 168-173, XP032003662, DOI: 10.1109/ICUFN.2011.5949156, ISBN: 978-1-4577-1176-3.
(Continued)

*Primary Examiner* — Sulaiman Nooristany
(74) *Attorney, Agent, or Firm* — Leason Ellis LLP

(57) ABSTRACT

System and method for providing data access to mobile network nodes of a digital data network, said system comprising: a local mobility anchor node, herewith LMA, which has an uplink interface to an upstream network, a plurality of mobility access gateways, herewith MAGs, which are fixed access points comprising a wired interface to the LMA, one or more mobile mobility access gateways, herewith mMAGs, which are mobile, in particular vehicle, access points comprising a wireless interface to a MAGs or other
(Continued)

mMAGs, a mobile network node, herewith MNN, comprising a wireless interface to a MAG or mMAG, each of said mMAGs configured for establishing a network binding to the LMA through an access point, by connecting to said access point, the access point being a MAG or another mMAG, such that data packets arrived at the LMA and destined to the MNN are routed and forwarded to the MNN through the mMAG.

7 Claims, 15 Drawing Sheets

(51) Int. Cl.
    *H04W 8/02*     (2009.01)
    *H04W 48/16*     (2009.01)
    *H04W 8/26*     (2009.01)
    *H04W 24/02*     (2009.01)
    *H04W 36/00*     (2009.01)
    *H04W 84/00*     (2009.01)
    *H04W 84/12*     (2009.01)
    *H04W 88/16*     (2009.01)

(52) U.S. Cl.
    CPC .............. *H04W 8/26* (2013.01); *H04W 24/02* (2013.01); *H04W 36/0016* (2013.01); *H04W 76/022* (2013.01); *H04W 84/005* (2013.01); *H04W 84/12* (2013.01); *H04W 88/16* (2013.01)

(56) References Cited

OTHER PUBLICATIONS

Jeon Instituto De Telecomunicacoes B Sarikaya Huawei R L Aguiar Universidade De Aveiro S: "Network Mobility Support using Mobile MAG in Proxy Mobile IPv6 Domain; draft-sijeon-netext-mmag-pmip-00.txt", Network Mobility Support Using Mobile MAG in Proxy Mobile IPV6 Domain; Draft-Sijeon-Netext-MMAG-PMIP-00.Txt, Internet Engineering Task Force, IETF; StandardWorkingDraft, Internet Society (ISOC) 4, Rue Des Falaises CH- 1205 Geneva, Switzerland, Oct. 16, 2012 (Oct. 16, 2012), pp. 1-9, XP015088029.

* cited by examiner

METHOD AND SYSTEM FOR PROVIDING DATA ACCESS TO MOBILE NETWORK NODES OF A DATA NETWORK

TECHNICAL FIELD

The present disclosure relates to digital data networks comprising mobile nodes, in particular vehicular digital data networks, in particular technology that normally uses moving cars as nodes in a network to create a mobile network, in particular the mobility support required for the digital data networks of vehicles and users so that they are connected to the best available access point maintaining their open sessions, while performing seamless handovers between the access points.

BACKGROUND ART

In the near future, it is expected that most vehicles will be able to access the Internet either contacting the Road-Side Units (RSUs) that compose the vehicular infrastructure (using IEEE 802.11p or IEEE 802.11a/b/g/n) or through cellular networks (3G and 4G). RSUs can also be used to improve connectivity and communication between vehicles. In order to grant that internet access, the mobility of the users must be supported to keep their sessions active while they are moving between access points.

In a general network context, several mobility protocols have already been proposed (and they are referenced at the end of this document) that can be used to support the users' mobility: (i) some provide full support for individual mobile node movement including the mobile node in the mobility process (for instance, MIPv6); (ii) others provide full support for individual mobile node movement without the need of any mobility related processing in the mobile node (for instance, PMIPv6); (iii) others provide full support for both individual mobile node movement and sub-network movement, including the mobile node in the mobility process (for instance, NEMO); (iv) others provide full support for both individual mobile node movement and sub-network movement, without the need of any mobility related processing in the mobile node (for instance, PNEMO). However, there are only a few studies of their application in a real vehicular environment or of their application with the IEEE 802.11p technology. Therefore, they do not always provide the best mechanisms for a correct application over a vehicular network.

These facts are disclosed in order to illustrate the technical problem addressed by the claimed invention.
Further References
Carlos Ameixieira, José Matos, Ricardo Moreira, André Cardote, Arnaldo Oliveira, and Susana Sargento. An ieee 802.11 p/wave implementation with synchronous channel switching for seamless dual-channel access (poster). In Vehicular Networking Conference (VNC), 2011 IEEE, pages 214_221. IEEE, 2011
Jorge Dias, André Cardote, Filipe Neves, Susana Sargento, and Arnaldo Oliveira. Seamless horizontal and vertical mobility in vanet. In Vehicular Networking Conference (VNC), 2012 IEEE, pages 226_233. IEEE, 2012
Seil Jeon, Rui Aguiar, and Behcet Sarikaya. Network mobility support using mobile mag in proxy mobile ipv6 domain. IETF draft-sijeon-netext-mmag-pmip-00, 2012.
Fumio Teraoka and Tetsuya Arita. Pnemo: a network-based localized mobility management protocol for mobile networks. In Ubiquitous and Future Networks (ICUFN), 2011 Third International Conference on, pages 168_173. IEEE, 2011.

SUMMARY OF THE DISCLOSURE

In a vehicular network, all vehicles should act as mobile routers providing access to the fixed infrastructures to both its passengers and other vehicles. This allows an access range extension through multi-hop over the vehicles chain. While the vehicle moves along different access points, fixed or mobile, its own sub-network, composed mostly by its passengers, moves with it since the mobility of the entire sub-networks is also supported. An embodiment provides regular internet access to the occupants of a vehicle moving within a city. We have developed an overall mobility architecture, including its protocols, mechanisms and algorithms, to be applied over vehicular networks in order to support IPv6 mobility of mobile nodes (for instance, vehicles and users) while moving between both Wi-Fi, cellular and WAVE technologies. The architecture is composed by:
  A Local Mobility Anchor (LMA), which is the central node of the architecture, being this node located on a network machine (for instance, server, desktop, cloud, etc.);
  A Mobile Access Gateway (MAG), which is a fixed infrastructure access point, that can be replicated in the architecture (for instance, Wi-Fi hotspots, Road Side Units, etc.);
  A mobile MAG (mMAG), which is a mobile access point inside a vehicle, that can be replicated in the architecture (for instance, personal vehicles, trucks, boats, etc.);
  A Mobile Network Node, which is an user device, that can be replicated in the architecture (for instance, smartphones, laptops, tablets, multimedia devices, etc.);
where the entities are connected as following:
  The LMA provides connection to the World Wide Web (WWW) and connects to the MAGs by wired links.
  The MAGs provide wireless networks to allow its users to connect to the backbone network. The wireless technologies available are IEEE 802.11a/b/g/n/p and 3G/LTE.
  The mMAGs allow extending the network by connecting to MAGs or other mMAGs providing Wi-Fi networks to its Users (MNNs) allowing them to access the WWW.
and comprise the following features:
  Support for multi-hop capabilities over mobile access points (mMAGs);
  IEEE 802.11a/b/g/n interface virtualization solution;
  Router Solicitation adaptation for compatibility with the IEEE 802.11p technology and IP tables configuration to handle Neighbor Solicitations;
  Support for partial IPv4 mobility over the IPv6 network managed by the developed mobility protocol;
  Connection Manager responsible by manage the available connections;

In an embodiment the mobility protocol ensures support for both individual mobile nodes and entire sub-networks movement between both fixed and mobile access points. This safeguards users' active sessions.

In an embodiment the multi-hop allows extending the range of the connection to the fixed infrastructure using the vehicle chain to retransmit the information. This should significantly reduce the need for fixed infrastructures. The embodiment also provides connection to the users within each vehicle.

In an embodiment the use of virtual IEEE 802.11g interfaces allows using only one physical interface to both connect and broadcast a Wi-Fi network ensuring maximum functionalities while keeping the production and maintenance costs to a minimum.

In an embodiment the support for the WAVE technology will enhance the mobility of the network since it is a technology designed to be applied over vehicular networks and is mobility prepared providing handover times much slower than Wi-Fi, for instance.

In an embodiment the IPv4 mobility support allows regular IPv4 devices to access the internet within a vehicle even when it is moving between the available access points. This ensures maximum device compatibility with the vehicular network since both IPv4 and IPv6 devices can get access.

In an embodiment, while the vehicle/user is moving, the Connection Manager evaluates the available networks from each technology and connects the mobile node to the one which presents the best conditions. It then triggers the action from the mobility protocol to keep the active sessions despite the handover between access points. Ensuring the minimum number of handovers possible, the Connection Manager also ensures seamless handovers with reduced packet loss.

It is disclosed a solution to support user and vehicle mobility between both fixed and mobile access points. This solution also supports range extension through multi-hop over chained mobile gateways (vehicles). Users can access the network by IPv6 or IPv4 devices since both are supported. The solution is fully compatible with the IEEE 802.11p technology, since the message handling has been modified accordingly. The solution comprises a Connection Manager capable of evaluating the available networks in each technology, ensuring that the mobile node is always connected to the one which presents better conditions and triggering the handover whenever needed.

The IPv6 mobility support is provided by an implementation of a mobility protocol based on the N-PMIPv6 protocol, which is herewith incorporated by reference, and adapted in order to work properly with the IEEE 802.11p technology, and also to allow multi-hop extension of the network. The Router Solicitation message was modified and the IP tables' functionalities were used to block unwanted Neighbor Solicitation messages in IEEE 802.11p (in Wi-Fi these messages are sent only after an association to the specified network has been made, so they are only sent to that network).

The IPv4 mobility support is provided by an IPv4-in-IPv6 tunneling system over the IPv6 network, which is managed by the mobility protocol, jointly with a NAPT server on the central node of the network, the Local Mobility Anchor (LMA), which will route the IPv4 requests to the internet.

The choice between the active technologies is performed through a connection manager that is able to seamlessly select the best technology according to the different features of vehicular mobility scenarios. In an embodiment, when the vehicle is moving along the road, it will be surrounded by multiple access points transmitting through different technologies. The connection manager has to scan the networks along the way selecting the one which presents the best conditions, and triggers the handover of the vehicle to that network. Every time a vehicle changes its point of attachment, its users also have their mobility supported in order to maintain their open sessions active, being the handover procedures completely transparent for the user.

Since the vehicular networks are such a high dynamic networks with mobile nodes moving at high speeds and possible in opposite directions, this narrow relationship between the mobility protocol and the connection manager is of maximum importance, and therefore the connection manager has to be implemented taking into account the special characteristics of the vehicular networks. To reduce the number of performed handovers the following mechanisms are used: (i) for the IEEE 802.11p technology, every time a handover occurs between these types of networks, it has to wait a given period of time before being allowed to perform another handover. This introduces a hysteresis mechanism that reduces the number of unnecessary handovers; (ii) for the IEEE 802.11g technology, a new scan of the available networks and a possible handover are only allowed if there is no active connection or if the RSSI of the current connection is lower than a given threshold level. This reduces the number of performed handovers as well as the scans made in that interface, which is an operation that blocks the interface resulting in packet loss.

It is disclosed a system for providing data access to mobile network nodes of a digital data network, said system comprising:
  a local mobility anchor node, herewith LMA, which has an uplink interface for connecting said digital data network to an upstream network,
  a plurality of mobility access gateways, herewith MAGs, which are fixed infrastructure access points, each of which comprises a wired interface for communicating with the LMA,
  one or more mobile mobility access gateways, herewith mMAGs, which are mobile access points, each of which comprises a wireless interface for communicating with the MAGs or other mMAGs,
  a mobile network node, herewith MNN, comprising a wireless interface for communicating with the MAGs or mMAGs,
  each of said mMAGs being configured for establishing a network binding to the LMA through an access point, by connecting to said access point, the access point being a MAG or another mMAG, such that data packets arrived at the LMA and destined to the MNN are routed and forwarded to the MNN through said access point and the mMAG.

In an embodiment, the binding between mMAG and the LMA is an IP tunnel, a VPN, a VLAN, or IP packet encapsulation.

In an embodiment, each mMAG further comprises a connection manager module configured for:
  selecting the one of the available access points which said connection manager module considers in best communication conditions, and
  triggering a handover by the mMAG from any current access point to the selected access point,
  in particular the connection manager module is further configured for, in wireless access in vehicular environments, herewith WAVE, access points, requiring a predefined minimum of time before a new access point can be selected.

In an embodiment, the wireless interface between mMAG and MAG is a wireless access in vehicular environments, herewith WAVE, interface or a wireless local area network, herewith Wi-Fi, interface.

In an embodiment, the wireless interface between MNN and mMAG is a wireless local area network, herewith Wi-Fi, interface.

In an embodiment, the Wi-Fi wireless interfaces of the mMAG are virtual Wi-Fi interfaces of a physical Wi-Fi interface.

In an embodiment, the upstream network is the Internet or a network with Internet connectivity.

It is also disclosed a method for operating any of the described systems, for providing data access to mobile network nodes of a digital data network, for connecting a mMAG to an access point, the access point being a MAG or another mMAG, said method comprising:
  when a mMAG attaches to the access point, the mMAG sends a Router Solicitation, herewith RS, message to the access point,
  upon receiving the RS message, the access point sends a binding setup, herewith PBU, message to the LMA, said PBU message containing an ID of the mMAG,
  upon receiving the PBU message, the LMA assigns the mMAG a first Home Network Prefix, herewith HNP-1, creates a corresponding Binding Cache Entry, herewith BCE, data record which comprises the ID of the mMAG, the ID of the access point, the HNP-1 and a M flag, wherein the M flag indicates whether the access point is a mobile access point, i.e. if the access point is a mMAG, and returns a binding acknowledge message, herewith PBA, message to the access point,
  upon receiving the PBA message, the access point sends a Router Advertisement, herewith RA, message containing the HNP-1 to the mMAG, network routing and packet forwarding between the mMAG and the LMA is then carried out by a network binding between mMAG and the LMA.

In an embodiment, the binding between mMAG and the LMA is an IP tunnel, a VPN, a VLAN, or IP packet encapsulation.

In an embodiment, the binding between mMAG and the LMA is an IP tunnel, the binding setup message is a Proxy Binding Update message and the binding acknowledge message is a Proxy Binding Acknowledge message.

It is also disclosed a method, for connecting a mMAG to an access point, the wireless connection between mMAG and access point being a IEEE 802.11p connection or a wireless access in vehicular environments, herewith WAVE, connection, said method comprising:
  when a mMAG attaches to said access point, the mMAG sends said RS message only to the access point to which connection is desired.

It is also disclosed a method, for maintaining the connection between the mMAG and the access point, said method comprising:
  sending periodically keep-alive messages between the connected mMAG and respective access point.

It is also disclosed a method, for maintaining the connection between the mMAG and the access point, said method comprising:
  the mMAG ignoring keep-alive messages received from any previously connected and currently unconnected access point, in particular ignoring keep-alive messages by using one or more IP tables' or firewall entries.

It is also disclosed a method for maintaining the connection between the mMAG and the access point, wherein the keep-alive messages are neighbour solicitation and neighbour advertisement messages.

It is also disclosed a method for operating any of the described systems, for providing data access to mobile network nodes of a digital data network, for connecting a MNN to an access point, the access point being a MAG or a mMAG, said method comprising:
  when a MNN attaches to the access point and if access point has received a Router Advertisement, herewith RA, message containing a Home Network Prefix, the access point then sends a binding setup, herewith PBU, message to the LMA, said PBU message containing an ID of the MNN,
  upon receiving the PBU message, the LMA assigns the MNN a second Home Network Prefix, herewith HNP-2, creates a corresponding Binding Cache Entry, herewith BCE, data record which comprises the ID of the MNN, the ID of the access point, the HNP-2 and a M flag, wherein the M flag indicates whether the access point is a mobile access point, i.e. if the access point is a mMAG, and returns a binding acknowledge message, herewith PBA, message to the access point,
  upon receiving the PBA message, the access point sends a Router Advertisement, herewith RA, message containing the HNP-2 to the MNN, network routing and packet forwarding between the MNN and the LMA is carried out by a network binding between the access point and the LMA.

In an embodiment, the binding between MNN and the LMA is an IPv4-in-IPv6 tunnel and the LMA end of the tunnel is a NAP/NAPT server.

In an embodiment, the binding between MNN and the LMA is an IP tunnel, a VPN, a VLAN, or IP packet encapsulation.

In an embodiment, the binding between mMAG and the LMA is an IP tunnel, the binding setup message is a Proxy Binding Update message and the binding acknowledge message is a Proxy Binding Acknowledge message.

It is also disclosed a method for operating any of the described systems, for routing a data packet arrived at the LMA and destined to the MNN, said method comprising:
  the LMA looks up the ID of the MNN in the Binding Cache Entry, herewith BCE, data records of the LMA and finds the respective access point in said data records;
  if the access point which was found is indicated by the M flag as a non-mobile access point, this access point is considered to be the fixed access point of the MNN and the LMA encapsulates or marks the packet for transport to the fixed access point;
  if the access point which was found is indicated by the M flag as a mobile access point, then the LMA encapsulates or marks the packet for transport to said mobile access point and the LMA proceeds to look up the ID of said mobile access point in the BCE data records and to find the subsequent respective access point, and:
    if this subsequent access point is then indicated by the M flag as a non-mobile access point, this access point is considered to be the fixed access point of the MNN and the LMA re-encapsulates or re-marks the packet for transport to said fixed access point,
    if this subsequent access point is then indicated by the M flag as a mobile access point, the LMA re-encapsulates or re-marks the packet for transport to said mobile access point and the LMA proceeds to look up the ID of said mobile access point in the BCE data records and to find the subsequent respective access point, and this subsequent access point process is repeated until a fixed access point is found;
  after a fixed access point is found, the packet is then transmitted to the fixed access point.

It is also disclosed a method for operating a mMAG of any of the described systems, for providing data access to mobile network nodes of a digital data network, said method comprising, for connecting a mobile network node to said mMAG, said mobile node being a MNN or another mMAG:

when the mobile node attaches to the mMAG, the mMAG receives a Router Solicitation, herewith RS, message sent by the mobile node, upon receiving the RS message, the mMAG sends a binding setup, herewith PBU, message to the LMA, said PBU message containing an ID of the mobile node, the mMAG receives a binding acknowledge message, herewith PBA, message from the LMA, upon receiving the PBA message, the mMAG sends a Router Advertisement, herewith RA, message containing a Home Network Prefix, herewith HNP, to the mobile node, network routing and packet forwarding between the mobile node and the LMA is then carried out by a network binding between mMAG and the LMA, said method further comprising, for connecting said mMAG to an access point, the access point being a MAG or another mMAG;

when a mMAG attaches to the access point, the mMAG sends a RS message to the access point, the mMAG receives from the access point a RA message containing the HNP, network routing and packet forwarding between the mMAG and the LMA is then carried out by a network binding between the access point and the LMA.

In an embodiment, the binding between mMAG and the LMA is an IP tunnel, the binding setup message is a Proxy Binding Update message and the binding acknowledge message is a Proxy Binding Acknowledge message.

It is also disclosed a non-transitory storage media including program instructions for implementing a method for providing data access to mobile network nodes of a digital data network, the program instructions including instructions executable to carry out any of the described methods.

BRIEF DESCRIPTION OF THE DRAWINGS

The following figures provide preferred embodiments for illustrating the description and should not be seen as limiting the scope of invention.

FIG. 19 shows a representation of the BCE data and packet encapsulation corresponding to the embodiment represented in FIG. 4.

DETAILED DESCRIPTION

Figure 1:
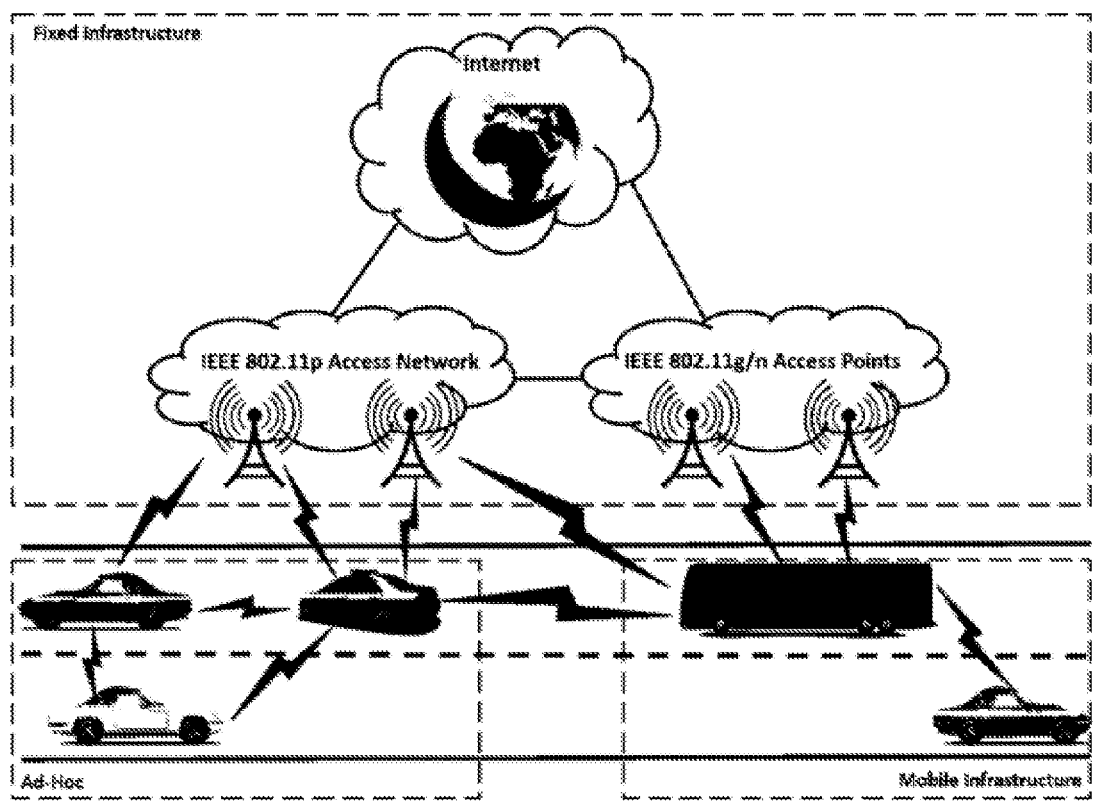
FIG. 1 shows a representation of the interaction of the vehicles with the fixed infrastructure as well as with other vehicles.

FIG. 1 shows a representation of the interaction of the vehicles with the fixed infrastructure as well as with other vehicles. The mobile access points, which are the vehicles, will be able to connect to the backbone network through WAVE or Wi-Fi connections and, in the case these ones are not available, through a 3G/LTE connection. The users can connect both by the vehicles through a Wi-Fi connection and through available infrastructure access points. The infrastructure access points can either be Wi-Fi access points or Road Side Units (RSUs), which provide WAVE access points.

Figure 2:
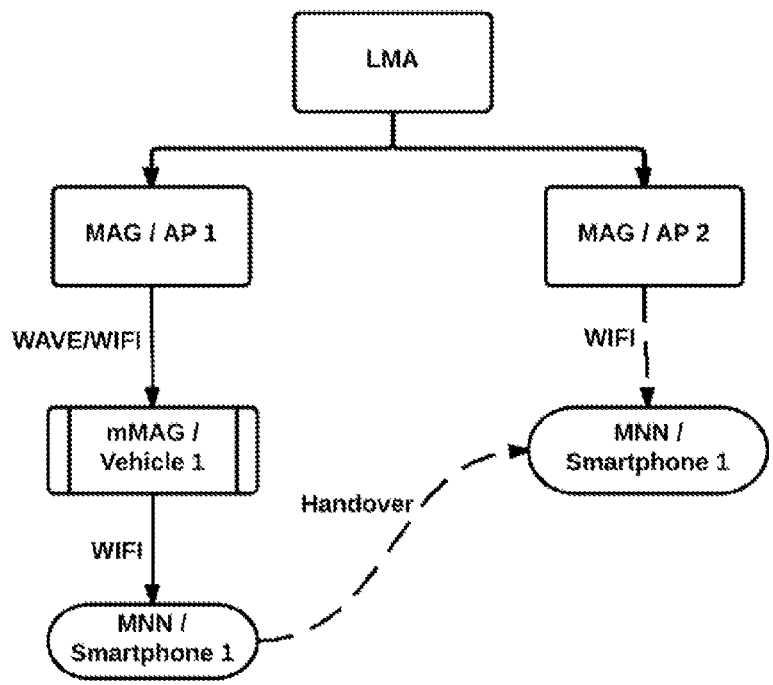
FIG. 2 shows a representation of a user performing handover between a mobile access point (vehicle) and the fixed access point of the infrastructure.
Figure 3:
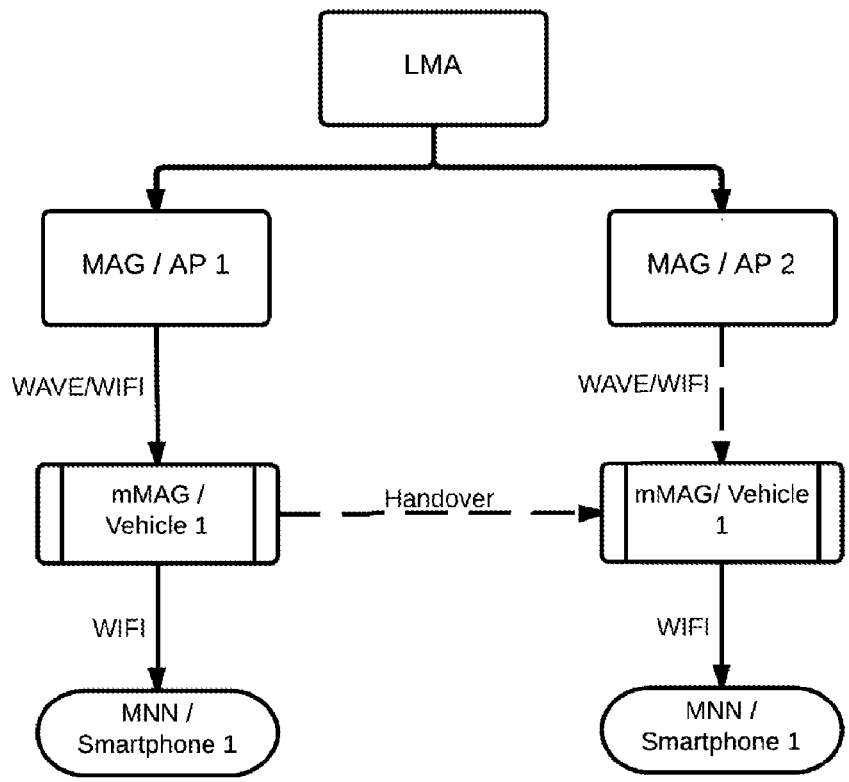
FIG. 3 shows a representation of a vehicle performing handover between different access points of the infrastructure, and all the users connected to the vehicle also moves with the vehicle with handover of its sessions.
Figure 4:
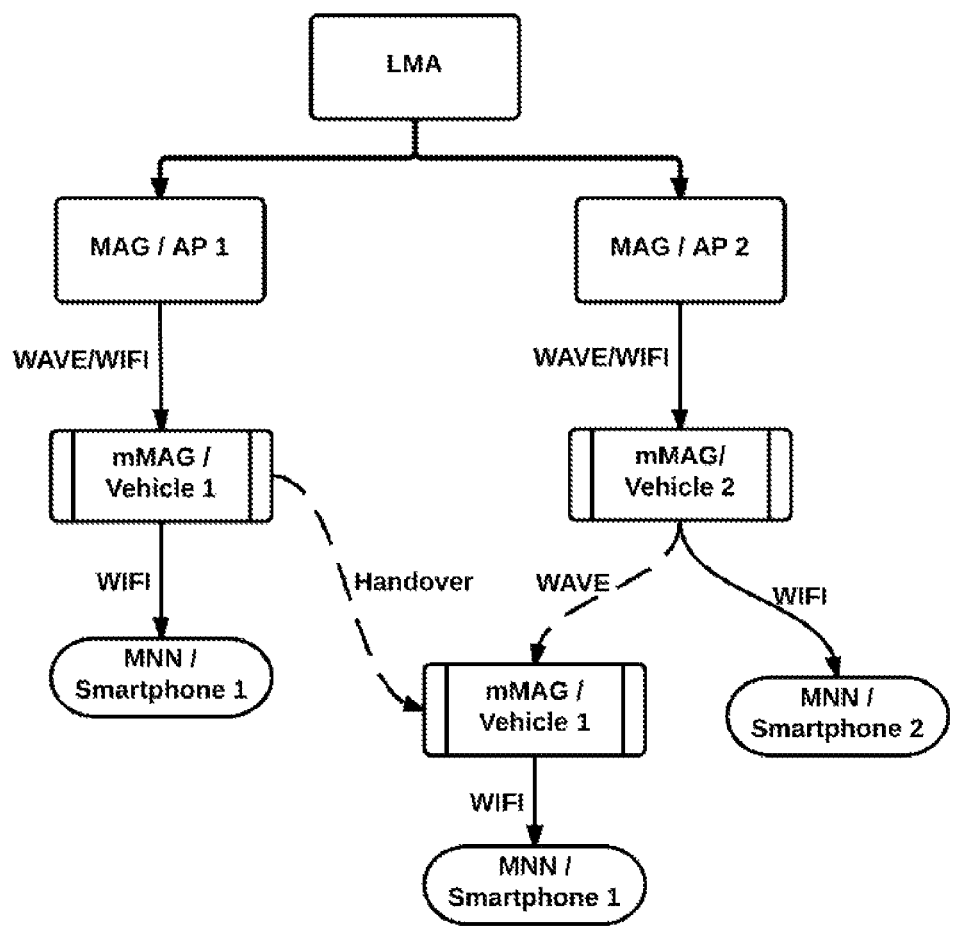
FIG. 4 shows a representation of a vehicle performing handover from the fixed infrastructure to a mobile access point (another vehicle). The users move with the vehicle to which they are attached. The range of the RSU 2 was extended through multi-hop over the connected vehicles, enabling communication between the fixed infrastructure and the users.
Figure 5:
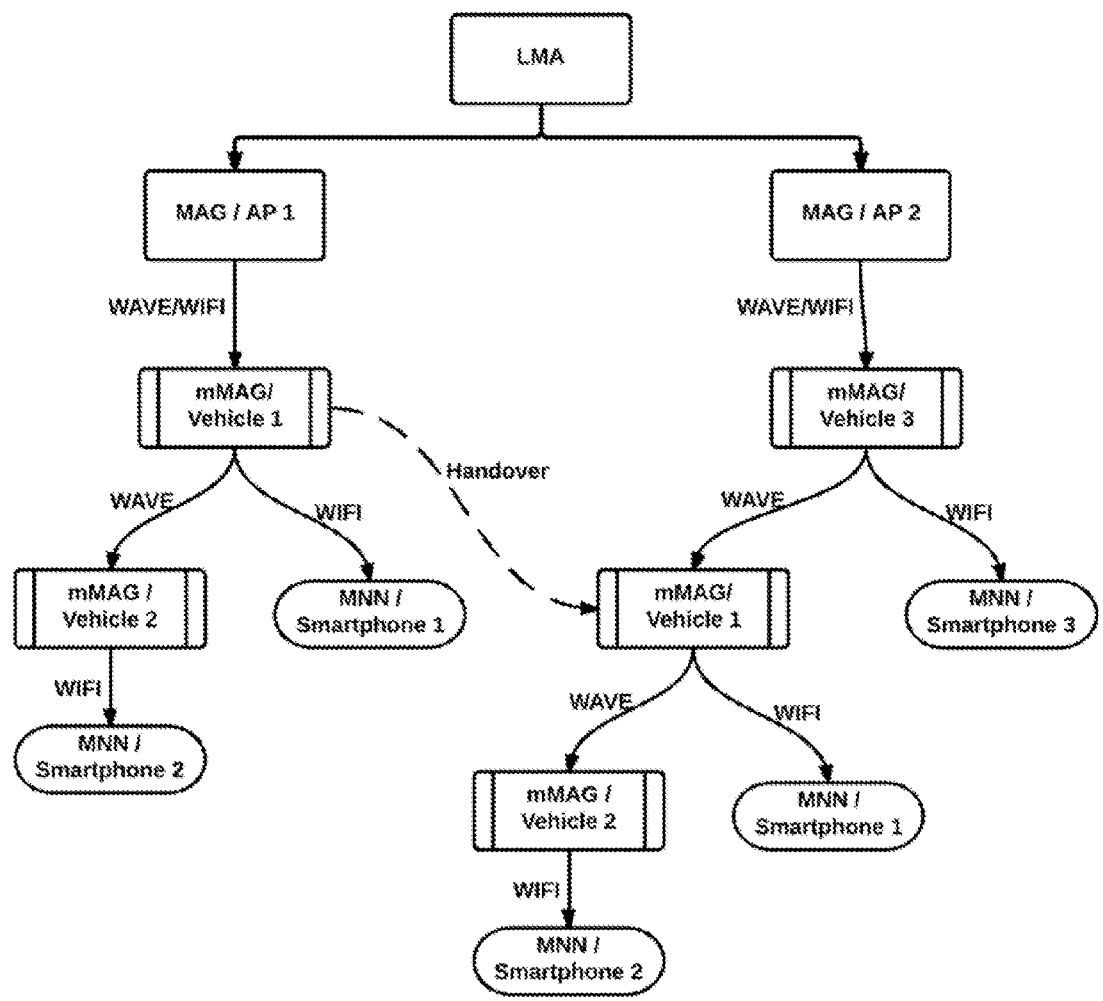
FIG. 5 depicts the network abstraction concept behind the multi-hop capabilities of the mobility architecture.

In order to reduce the probability of connection lost a mobility protocol was developed as well as some mobility mechanisms, such as a connection manager. Together, they support the mobile nodes movement between the available access points even if they are transmitting using different technologies. From this, it is possible to achieve some important handover scenarios. FIG. 2 shows a representation of a user performing handover between a mobile access point and the fixed access point of the infrastructure. The user active sessions are kept when the user leaves the vehicle and connects to another available Wi-Fi connection on the street. FIG. 3 shows a representation of a vehicle performing handover between different access points of the infrastructure, and all the users connected to the vehicle also move with the vehicle. The process is transparent to the users, since they can maintain their connection to the vehicle as well as their open sessions without being affected by the handovers performed by the vehicle. FIG. 4 shows a representation of a vehicle performing handover from the fixed infrastructure to a mobile access point (another vehicle). The users move with the vehicle to which they are attached. The range of the RSU 2 was extended through multi-hop over the connected vehicles, enabling communication between the fixed infrastructure and the users. This handover procedure can also move dependent vehicles and its own users as is depicted in FIG. 5. This will reduce the need of deployment of fixed infrastructures, therefore reducing the cost of deployment of a vehicular network. This is possible due to the network abstraction depicted in FIG. 6.

Figure 7:
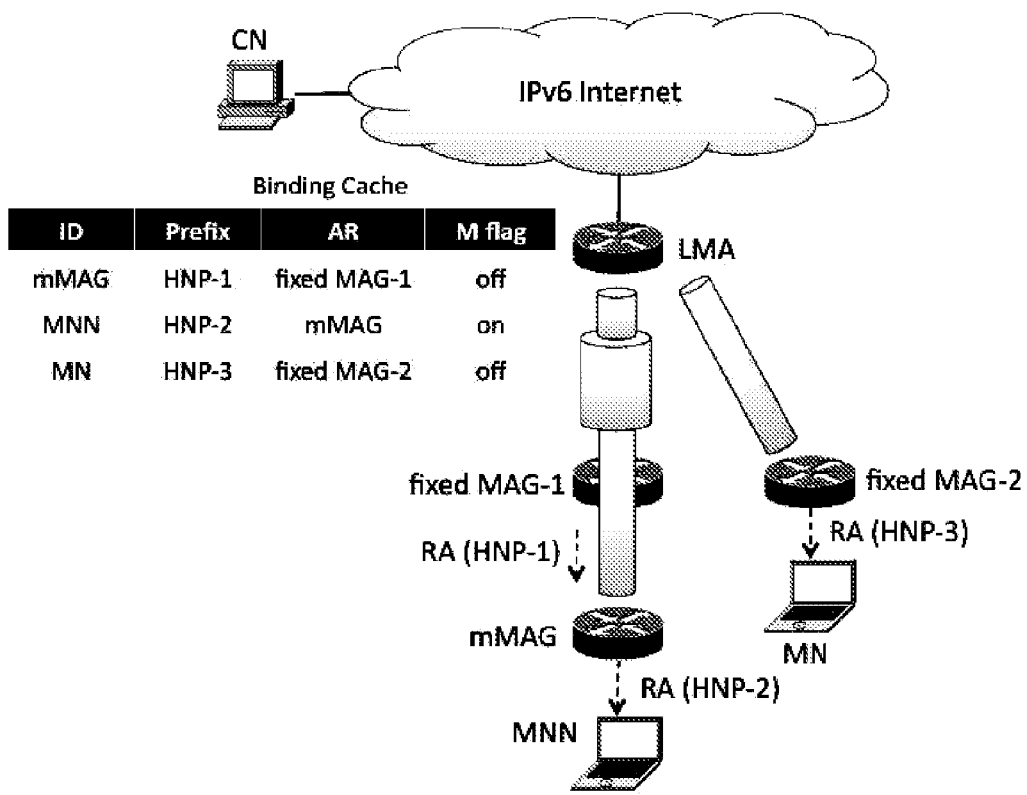
FIG. 7 shows a representation of the new operation method of the mobile MAG, which is the mobile router entity of the implemented mobility architecture.

The mobility protocol used as basis was the N-PMIPv6, which has already been described in previous publications. However, its implementation and adaptation to operate correctly under vehicular networks, especially due to the WAVE technology, have never been performed. FIG. 7 shows a representation of the N-PMIPv6 protocol operation method. This protocol has been implemented and adapted in order to fulfill the needs of our mobility architecture. The entities that compose the network are the Local Mobility Anchor (LMA), which is responsible for keeping the information and location of all the nodes, the Mobile Access Gateways (MAGs), which are the access points through the mobile nodes could connect, the mobile MAGs (mMAGs), which are entities with about the same functions than the MAGs, but are itself mobile and can connect and handover between MAGs, and the Mobile Network Node (MNN) which is the user that wants to connect to network. The registration and handover procedures are performed as follows:

When a mMAG with a MNN attaches to the fixed MAG-1, the fixed MAG-1 sends the Proxy Binding Update (PBU) message containing the mMAG-ID to the LMA.

Upon receiving the PBU, the LMA assigns the mMAG the Home Network Prefix-1 (HNP-1) and creates the Binding Cache Entry (BCE). Next, the LMA returns the Proxy Binding Acknowledge (PBA) to the fixed MAG-1.

Upon receiving the PBA, the fixed MAG-1 sends the Router Advertisement (RA) message containing the HNP-1 to the mMAG.

Upon receiving the RA message, the mMAG sends the PBU message containing the MNN-ID to the LMA.

Upon receiving the PBU message, the LMA assigns the MNN the HNP-2 and creates the BCE. N-PMIPv6 adds a new field, the M flag, to the BCE. The M flag of MNN BCE is set to indicate that the MNN is connected to a mobile network.

Next, the LMA returns the PBA to the mMAG. Upon receiving the PBA, the mMAG sends the RA message containing HNP-2 to the MNN.

The data packet destined to the MNN first reaches the LMA. The LMA finds MNN BCE. Since the M flag is 'on' in the MNN BCE, the LMA searches for mMAG BCE. Next, the LMA encapsulates the packet for tunneling to the mMAG and encapsulates it again for tunneling to the fixed MAG. The LMA forwards the packet to the fixed MAG. The fixed MAG removes the outer tunneling header and forwards it to the mMAG. The mMAG retrieves the original packet and forwards it to the MNN.

When the mMAG moves to the fixed MAG-2, the same procedures as in the initial registration are executed. In this procedure, the Access Router field of the mMAG BCE is updated from fixed MAG-1 to fixed MAG-2. Other fields of mMAG BCE and MNN BCE remain unchanged.

Multi-Hop Support

Figure 8A:
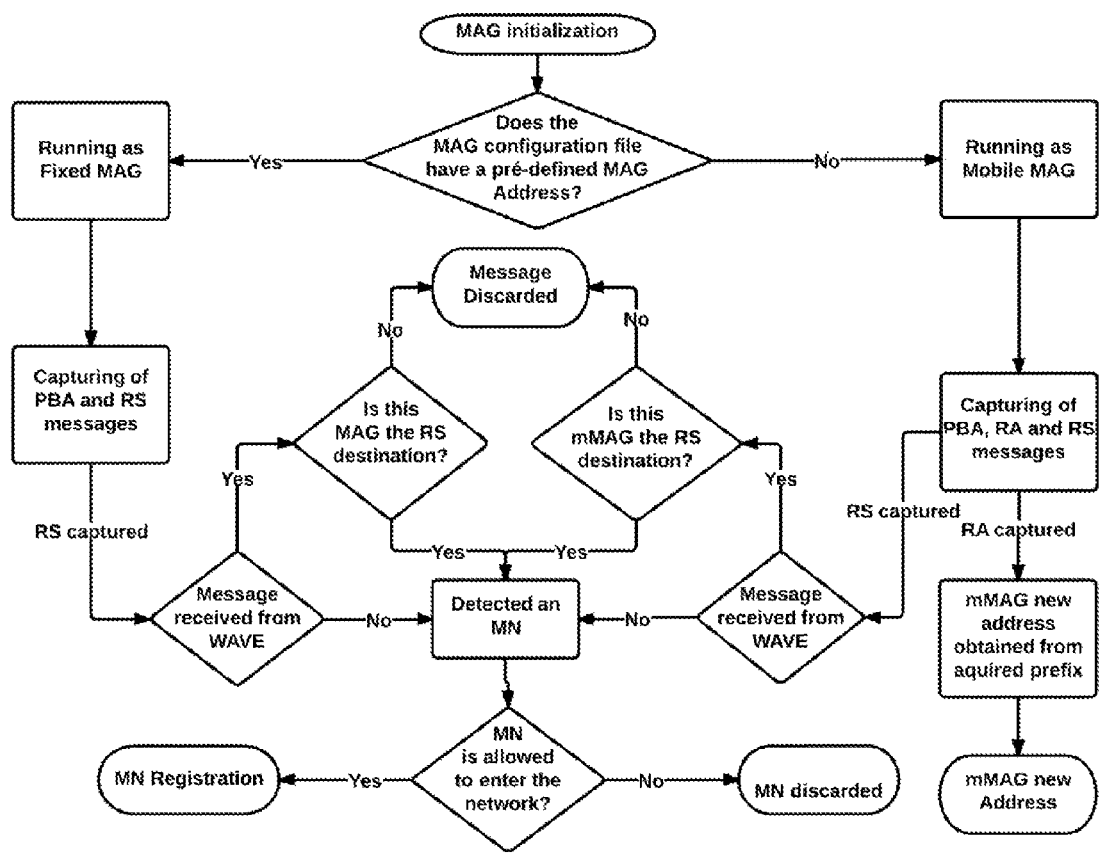
FIG. 8 shows a representation of the disclosed methods.
Figure 8B:
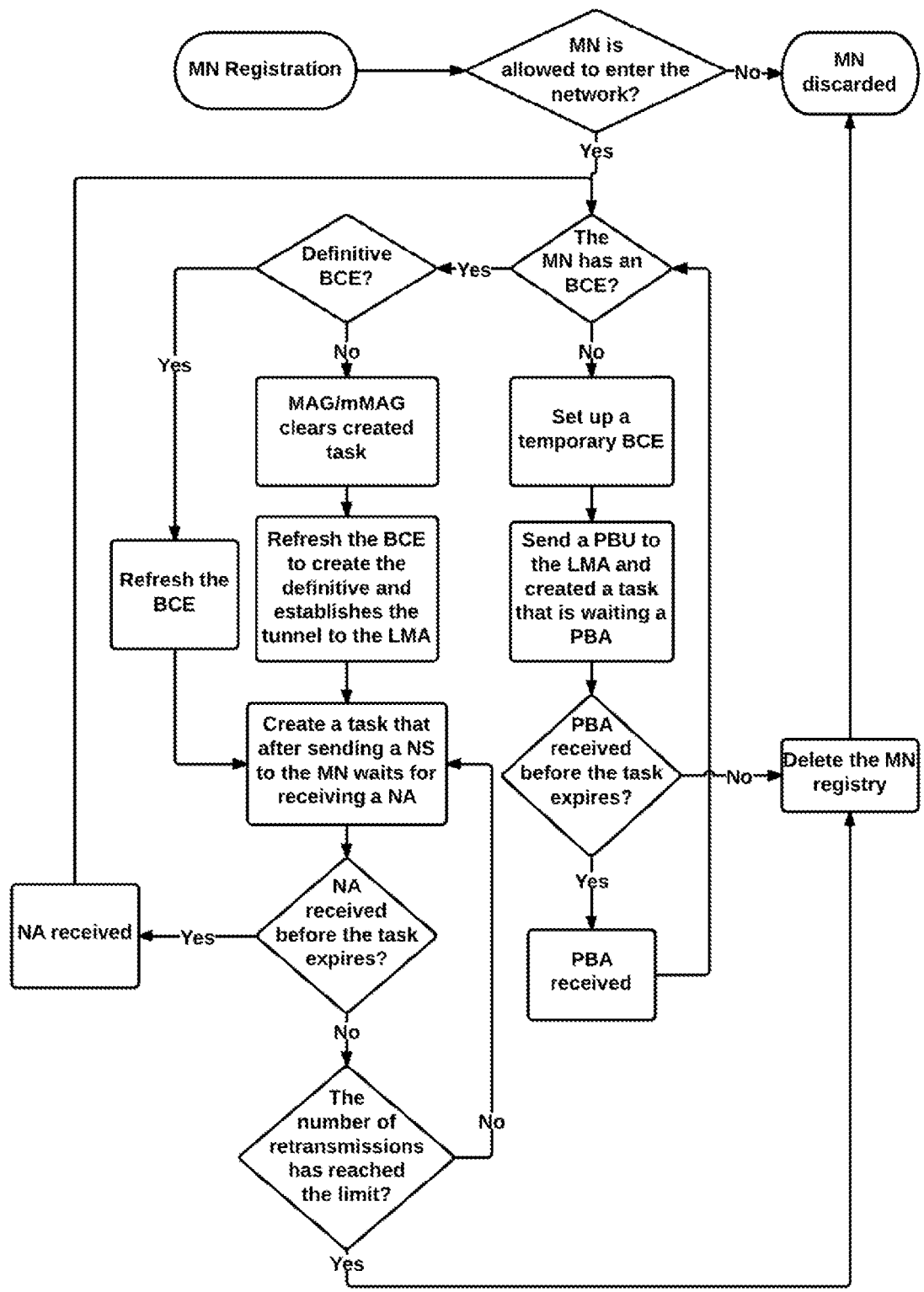

FIG. 8 depicts the new operation method of the fixed/mobile MAG entity of the mobility architecture. The MAG was extended to support the mobile MAG functionalities to enable multi-hop through chained mMAGs. In an embodiment, multi-hop functionalities will, on one hand, enable access and also support of the mobility of the users connected to the vehicles, while ensuring efficient handover conditions: every time a vehicle moves between two access points, it only has to update its position, and no updates are required to its passengers. This reduces the handover latency, therefore minimizing the possible packet loss. On the other hand, through multi-hop over the vehicles it is possible to extend the range of the fixed access points. For example, in zones with low traffic density, the need of RSUs is highly reduced since the connection from each one can be extended over a set of vehicles connected to each other and to the RSU.

Figure 6:
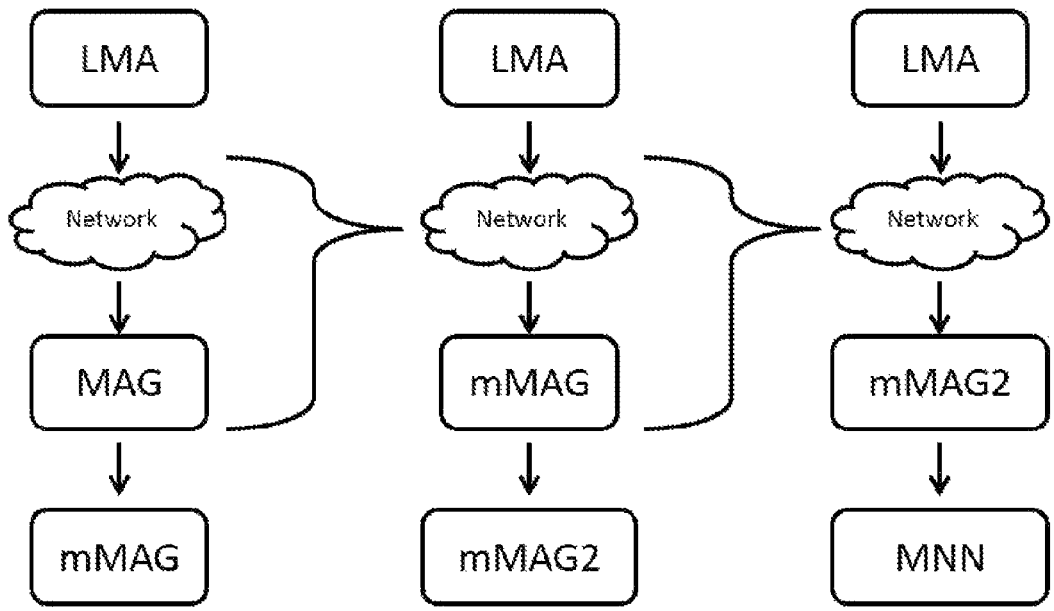
FIG. 6 shows a representation of the N-PMIPv6 protocol operation method.

This is possible due to the abstraction on the way how the mobility process has been developed. A mMAG (in FIG. 6) is a common user for the MAG which is providing connection, and another mMAG2 which wants to connect will also be treated as a simple client for the mMAG. The maintenance of the link/route for the LMA is guaranteed jointly with the connection manager, which forces the connection to the network that offers the best conditions. The FIG. 6 is an example to better understand the process. On the left side of the figure, the mMAG is seen as a regular user to the MAG to which it connects and it is registered normally. From this moment on, it is guaranteed, that regardless of the MAG that binds this node, it has ensured mobility and an active route to the LMA, which is the pre-requisite for a node to be able to act as mMAG. Then, it is assumed that the mMAG is indeed a fully operational MAG, and all the operations required between the mMAG and the LMA are only network routing and packet forwarding. Therefore, as can be seen in the center part of FIG. 6, another user (in this case another mobile MAG, mMAG2) will bind to mMAG as if it was a standard PMIPv6 registration, so the mMAG2 will then also get an IPv6 address, and it has guaranteed mobility between MAGs, and a route to the LMA. Again, this mMAG2 is now a fully functional MAG, and it may also serve other users, as it is shown in the right part of the figure where it registers another mobile node. In this way, the mobility architecture developed can support mMAGs chaining, which can significantly increase the coverage of the RSUs using multi-hop across the chained mMAGs, providing Internet access to users over a larger distance.

Wi-Fi to Connect to Fixed Hotspots and to the Users

In order to enable users within the vehicles to access the Internet as they normally do in their daily life, i.e., connect to the Internet using one of his personal devices, cellphone, tablet, laptop, or any other device with WI-FI capabilities, by simply connecting through the access point provided by the OBU. On the other hand, the OBU needs to be able to perform handover between networks of different technologies, one of them is the IEEE 802.11g (WI-FI). In this case, there will be times when the OBU must be able to be connected to a WI-FI network through which it connects to the Internet, and at the same time it will have to broadcast and maintain a WI-FI network to its users inside the car. Ideally, the OBU should have a single IEEE 802.11g interface that needs to be shared by both processes described before.

The same functionality is required in the IEEE 802.11p interface, which is also expected to be able to be a user and a network provider at the same time; however, this technology is able to perform this role, and therefore, having only one interface does not create any problem.

In the IEEE 802.11g interface, it was found that this was indeed impossible, because the interface broadcasts a network, which makes it impossible to use that same interface for connection to other networks while on the move, i.e. the application required for creating an Wi-Fi network within the vehicle to provide access to the users locks the associated interface and therefore this interface cannot be used by any other application. The only way to deal with the problem is to add an extra interface, which will increase the equipment costs, or create virtual interfaces over that same physical interface. To avoid extra costs a virtual interface was selected. To do this is required to use a feature of the "iw" module which allows to the user to create new interfaces (virtual ones) over an existing physical interfaces using the following command line:

iw<phyname> interface add <name> type <type>
example: iw phy0 interface add wlan3 type ap For this specific case the type selected the access point mode (AP) and the virtual interface MAC address was modified using the "macchanger" application. From this point, the system recognizes the virtual interface as a regular interface and therefore two interfaces are now available for use in the IEEE 802.11g technology, the regular one created by the system (for instance, the wlan2) and the virtual one created over the same physical interface (for instance, the wlan3). Since the virtual interface was created in access point mode it is then selected and configured to broadcast a Wi-Fi network within the vehicle running the "hostapd" application over the wlan3 interface. The original interface is then used to scan and connect to the available Wi-Fi networks along the way using the required "iw" features over the wlan2 interface ("iw <interface> scan" and "iw<interface> connect <SSID>"). This has some improvements comparing to the initial situation, as it allows searching and connecting to a Wi-Fi hotspot without the need of turning off the network which is being broadcasted within the vehicle since there are now two separate interfaces.

IEEE 802.11p and Mobility

The mobility architecture was also extended to work correctly with the IEEE 802.11p technology. Since this technology has no prior session establishment, in opposite to the IEEE 802.11g technology which is the one usually used to evaluate the mobility protocols, it has brought some problems to the mobility protocol control messages.

Figure 9:
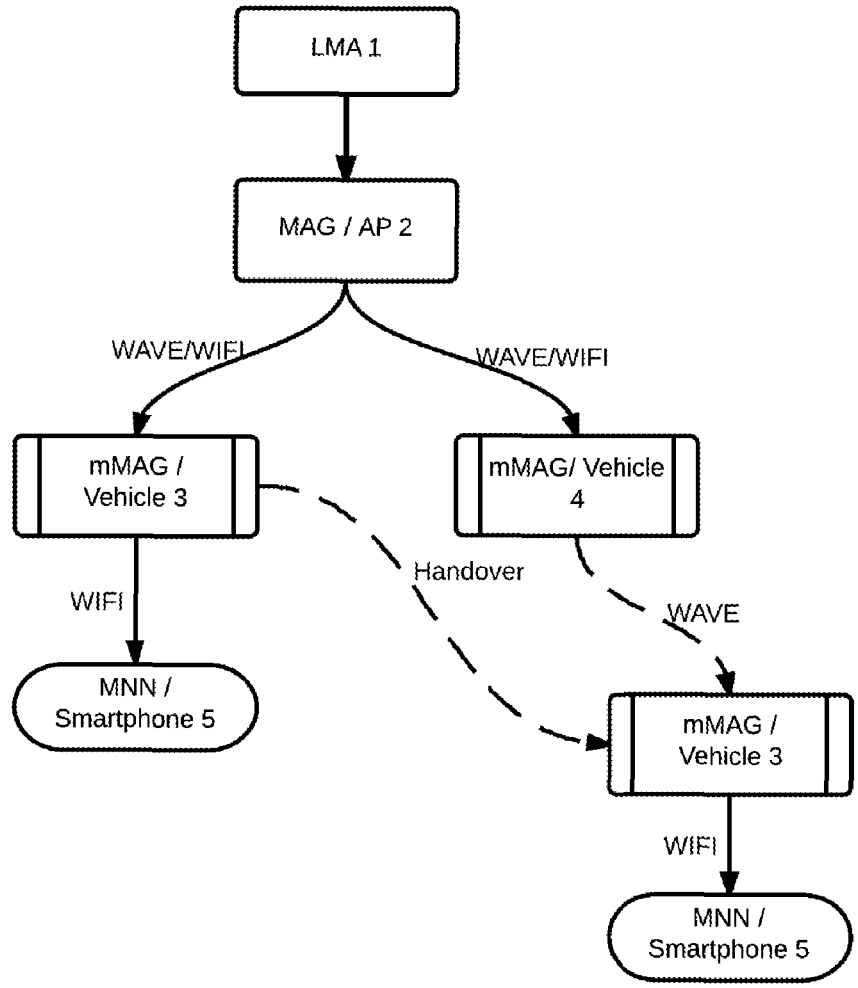
FIG. 9 shows a representation of the scenario used as basis for the following flow diagrams.
Figure 10:
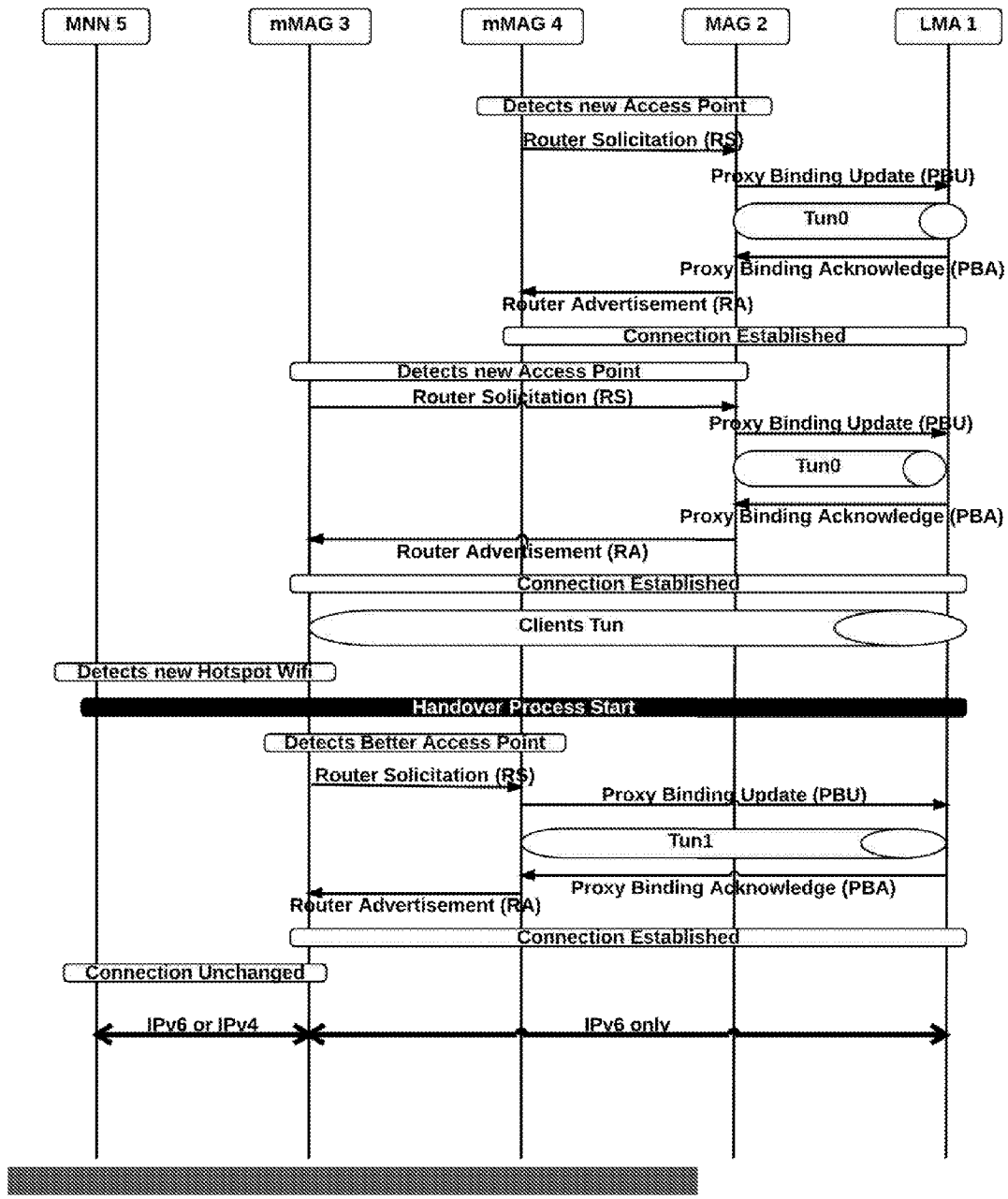
FIG. 10 shows a representation of the flow diagram of the messages switched between the entities during the registration of the nodes into the network as well as the handover procedure.

Taking FIG. 9 as a basis setup of the network, FIG. 10 depicts the messages exchanged between the entities in order to establish connection and perform handover between different access points. The registration procedure is triggered by a Router Solicitation message which is going to signal the access point to register the node. These messages have been established over a set of principles which are true for the prior session establishment technologies. The RS is an ICMP message sent to a specific multicast address, the ff02::2. Therefore, the MAG/mMAG should answer to any RS received whose target address is this one. Technologies with session establishment, such as the IEEE 802.11g, work well with this approach, because if the mobile node is connected to MAG/mMAG by this technology, then it is guaranteed that the packets sent by the mobile node will only be received by the MAG/mMAG with which it is associated, even if there are other MAGs within range.

With IEEE 802.11p technology a problem arises, since there is no prior session establishment on association by the user (mobile node) to the provider (MAG/mMAG). When the user sends the RS message to the multicast address ff02::2, all the MAGs will receive this message; on receiving an RS which destination address is ff02::2, they will start the registration assuming that the node does indeed require connection to them, when in fact it should only be received by the MAG to which the provider is associated to the user of the mobile node. This makes the LMA receive location updates of the mobile node from multiple MAGs which will end up on repeatedly move the ipv6_tunnel used to forward the messages between the multiple MAGs. The problem is that the mobile node has registered as a user of the provider of a specific MAG; therefore, only on a short time interval, in which the LMA has correctly assumed that the route is established through that MAG, it will be possible to correctly forward the messages.

To overcome this problem, the router solicitation message was modified to be sent explicitly to the desired gateway when the technology in use is the IEEE 802.11p, i.e., the message is sent explicitly to the desired gateway Link Local which will update the node position and start routing the nodes traffic. The program in use in the mobility architecture to send the router solicitation messages is the rdisc6, and it is used in the regular mode when the technology in use is not the IEEE 802.11p through the following format:

rdisc6<desired interface>

When the technology in use is the IEEE 802.11p, the message is sent explicitly as follows:

rdisc6<desired access point link local> <desired interface>

Figure 11:
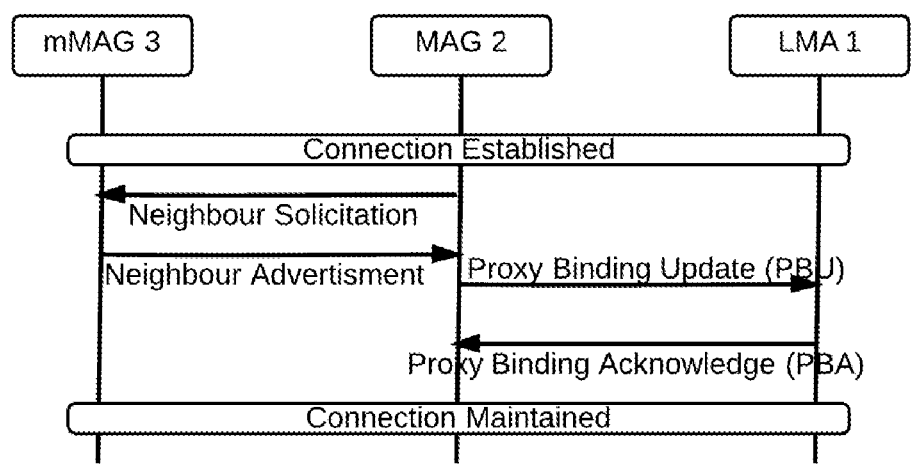
FIG. 11 shows a representation of the flow diagram of the messages switched between a node and its access point in order to keep their connection stable (alive).

After a successful registration of the node, the node and the access point have to, periodically, exchange alive messages in order to keep the connection active. Those messages are the neighbor solicitation/advertisement messages and the alive mechanism is depicted in FIG. 11.

Figure 12:
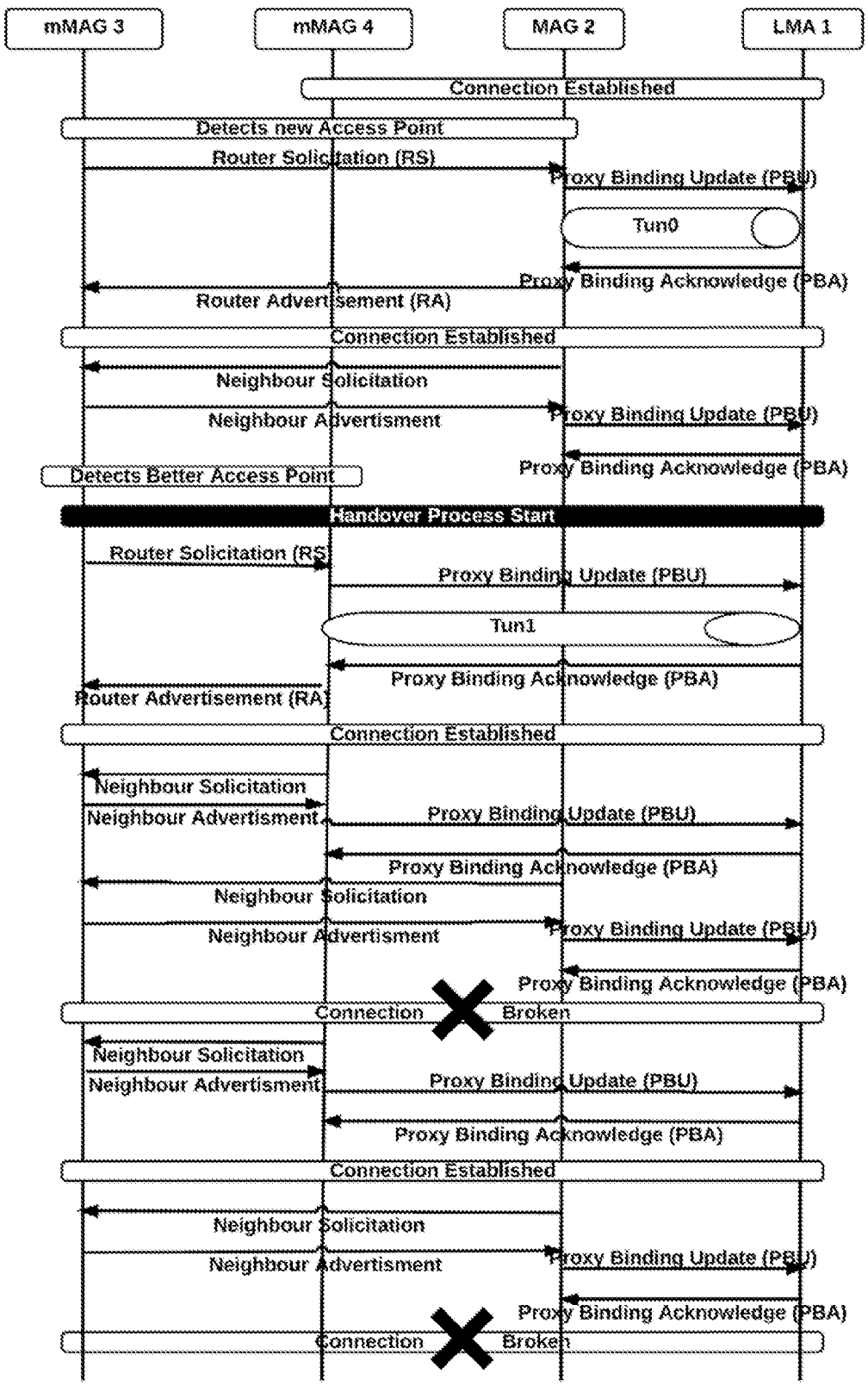
FIG. 12 shows a representation of the flow diagram of the messages exchanged between entities when a handover is performed and the effect of the alive messages which, due to the IEEE 802.11p specifications, lead to connection break since they are not ready to work correctly on a WAVE network.

Another incompatibility detected regards those messages. The mobility protocol depends on this type of messages to inquire if the mobile node is still connected to it or not. Usually, when the mobile node changes from a previous access gateway to a new one, if the previous access gateway sends a neighbor solicitation, no response will be received and therefore it assumes that the mobile node is no longer connected to it and deregisters the node. But when the technology in use is the IEEE 802.11p, even after the mobile node moves for a new access gateway, if the previous one sends the neighbor solicitation and the mobile node is still in range, it will receive the message and respond accordingly. After receiving the neighbor advertisement from the mobile node, the previous access gateway assumes that the mobile node is still connected to it, updates its connection and the traffic is routed over this access gateway and not through the new one. This leads to a connection break as is depicted in FIG. 12.

Figure 13:
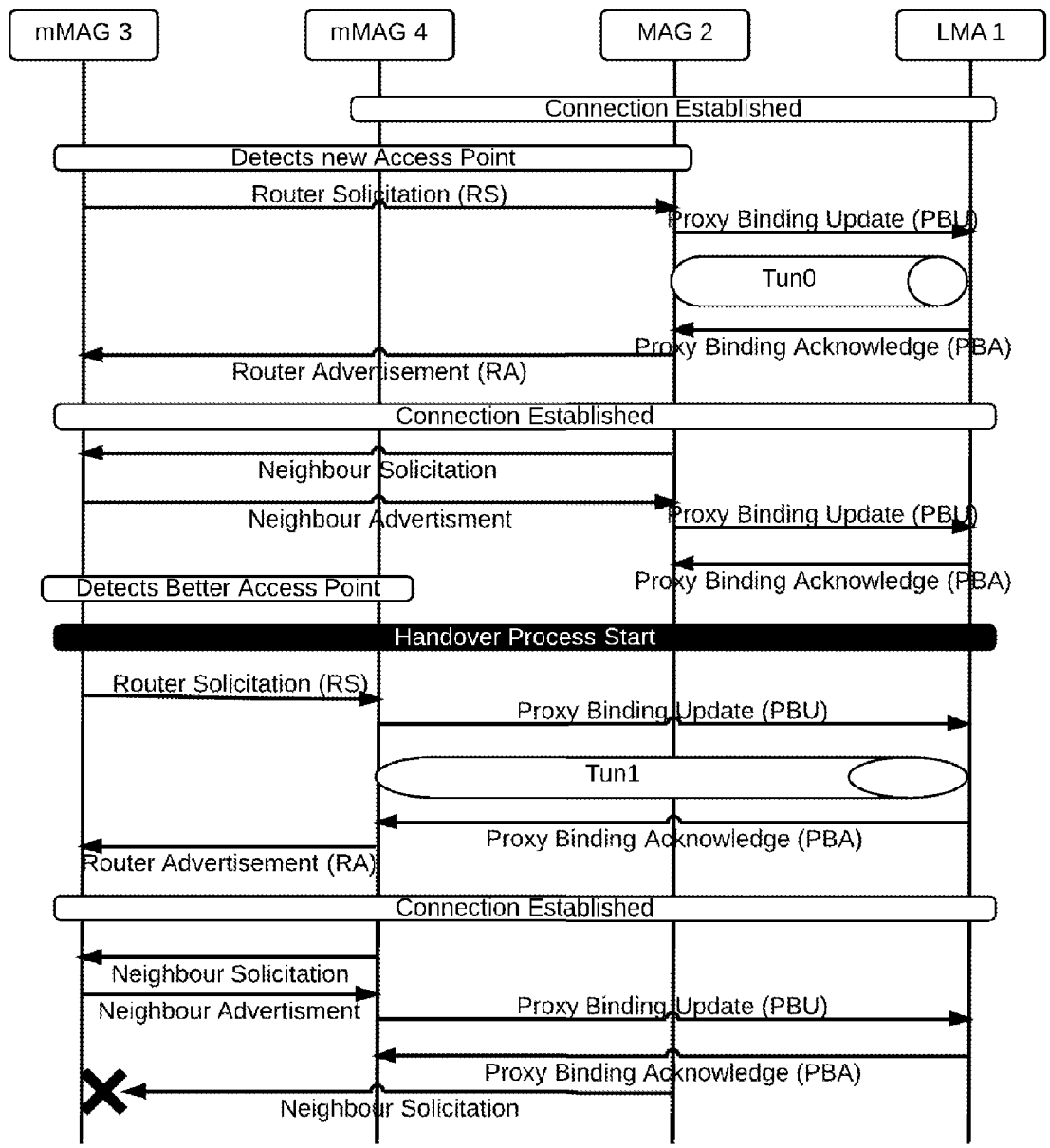
FIG. 13 shows a representation of the flow diagram of the messages exchanged between entities when a handover is performed with the alive messages blocking mechanism active which keeps the connection stable.

This problem can be solved if the mobile node, when moving from a previous access gateway to a new one, starts to reject all the Neighbor Solicitation messages which source is the previous access gateway, as depicted in FIG. 13. That way, the previous access gateway will not get any response to the sent Neighbor Solicitation messages, then assuming that the mobile node is no longer connected to it, processing its deregistration. The adopted solution is conceived through the functionalities of the IP6_TABLES module that allows to drop packets of a given ICMPv6 type from a given link local. Each time a mobile node moves from one MAG1/mMAG1 for another MAG2/mMAG2, it should record in the ip6tables an order to accept Neighbor Solicitation packets from the MAG2/mMAG2 and reject those from MAG1/mMAG1.

Support of IPv4 Terminals

In order to be able to connect a normal user in a real environment, it is expected that the vehicular networks, in addition to the applications made especially for them, also have the ability to share normal Internet access. Thus, the user within the car can connect to the available access point and access his email, social networks, games, just like he does at home or workplace. The problem in this support is that the majority of the existing personal devices only support IPv4 networking. Since the mobility protocol developed only supports IPv6 mobility, it would be impossible for the user to enjoy this service. To compensate for this issue, it is implemented a system that provides mobility to the users with IPv4 terminals.

The mobility protocol developed ensures that, even if the OBU/mMAG moves between different access points, it keeps connected with the rest of the N-PMIPv6 network. Under this assumption, it is guaranteed that the OBU while travelling along will keep a stable connection to the midpoint of the network, the LMA. Assuming that the LMA has IPv4 Internet connection, which is very likely, it is possible to create a system that allows the MNNs to use this link. This system is composed by an IPv4-in-IPv6 tunneling system between the mMAG and the LMA, to where it is redirected the traffic from the IPv4 network broadcasted by the mMAG with target addresses not belonging to that network. Moreover, it also contains a NAPT server (Network Address and Port Translation server) to run in parallel with the LMA, on the same machine, which will convert all requests originated on the mMAG network as if they were made by the LMA itself. When the response to these requests is received, the NAPT server back resets the original address and sends it over the established tunnel.

Figure 14:
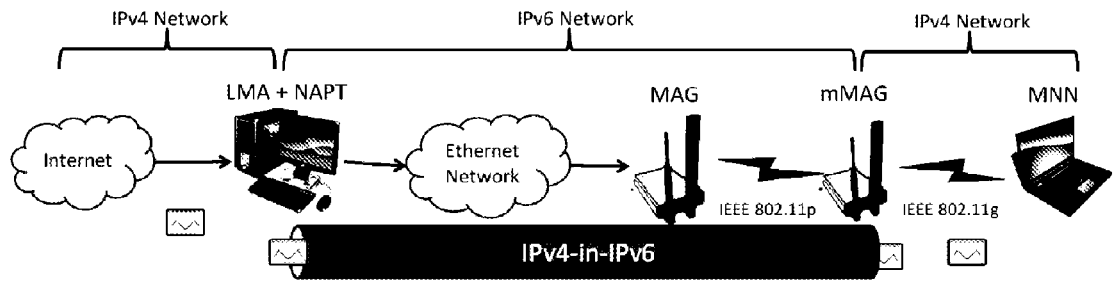
FIG. 14 shows a representation of the tunneling and NAPT system responsible for enabling IPv4 mobility support in the terminals.

The FIG. 14 depicts the process. A mMAG/vehicle connects to a MAG/fixed access point and is registered in the LMA getting an IPv6 address. From this point, the connection between the LMA and mMAG is ensured. The mMAG/vehicle also broadcasts an IPv4 Wi-Fi network for its passengers. The LMA has both IPv4 and IPv6 internet access. When the MNN/passenger connects to the vehicle, it gets an IPv4 address from the vehicles private IPv4 network. A tunnel between the LMA and the vehicle is then created to route the IPv4 traffic over the established IPv6 network. Although the private network broadcasted within the vehicle is not known in the internet since it has not a public address, to allow the passenger traffic to be forwarded to the internet without being dropped on its way back, a NAPT server is configured in the LMA. This ensures that every requests which arrive from the passenger are forward to the internet as requests of the LMA itself in a specific port. When an answer for that port arrives, the LMA then forwards that answer to the passenger through the previously established tunnel.

Since the mobility of the mMAG is guaranteed by the developed mobility protocol, it is then also ensured the mobility of the IPv4 users while they are enjoying the WI-FI network available. It is not possible, however, to ensure the mobility of users if they move between different mMAGs, and as such, it is not possible to ensure full mobility to users in IPv4.

Connection Manager

Figure 15:
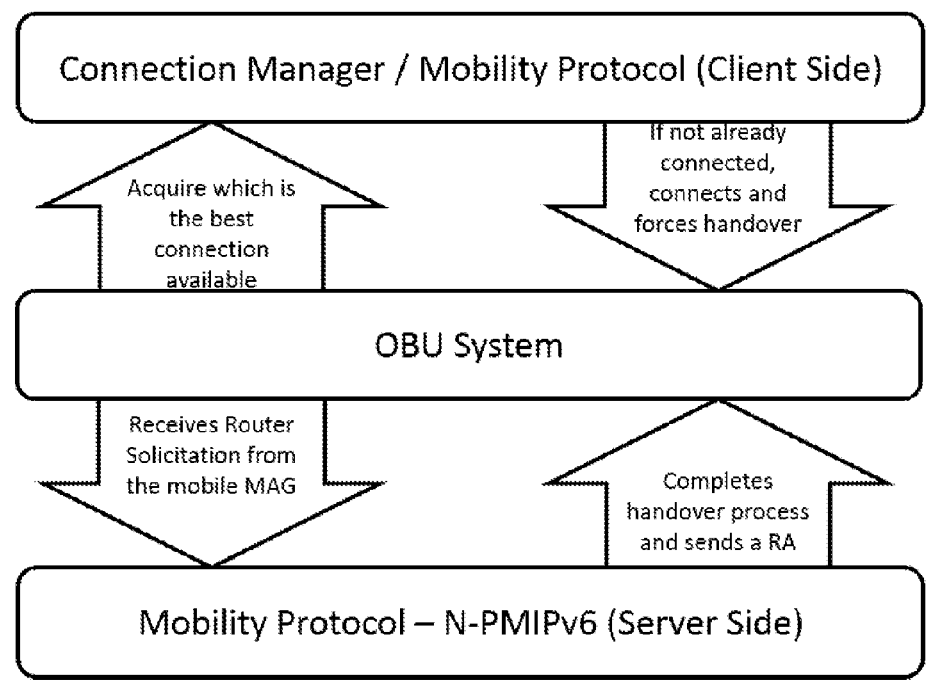
FIG. 15 shows a representation of the interaction between the connection manager and the mobility protocol on a mobile access point (vehicle).

To automate the handover process it was developed a connection manager capable of evaluating the available networks in order to select the connection which presents the best conditions, and then trigger the handover to that selected network. FIG. 15 shows a representation of the interaction between the connection manager and the mobility protocol on a mobile access point (vehicle). The connection manager ensures minimum connection loss while the mobility protocol ensures session maintenance.

Figure 16:
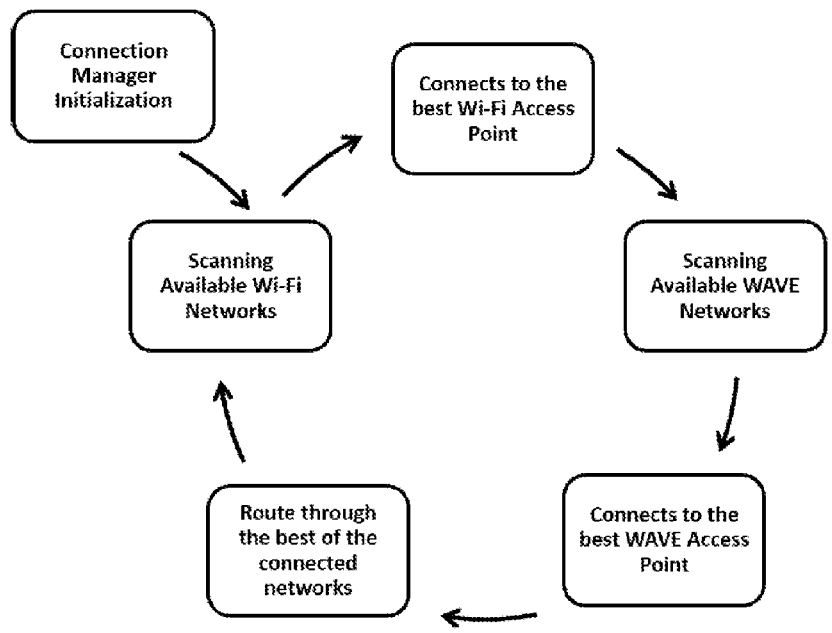
FIG. 16 shows a representation of the operation method of the Connection Manager.

The operation method of the connection manager, which is partially depicted in FIG. 16, starts by evaluating which of the available networks of each technology offers the best conditions. For the case of the WAVE technology, a new scan is made periodically determining the available networks and which one is the better one. If the node is not already connected to the selected network, the connection to the new access point is started and only after this connection is completely established, the previous connection is dropped. For the case of the Wi-Fi technology, a new scan is performed only if there is not an active connection or if the current Wi-Fi connection presents a signal strength (RSSI) lower than a pre-defined threshold. After determining the best available Wi-Fi connection, if the node is not already connected to the selected network, the previous connection is dropped and the connection to the new access point is started. Comparing the current connections of the node, i.e. comparing the best Wi-Fi connection with the best WAVE connection which have already been established, the connection manager forces the handover to the network presenting the best conditions, the traffic routes are changed to the new access point, and the control messages prevenient from the previous access point are blocked using the ip6tables module.

The connection manager triggers the handover on the mobility protocol side by sending a router solicitation message to the desired new access point. Only if there is no available connection on both Wi-Fi and WAVE technologies, the connection manager triggers the handover for the cellular network therefore reducing its use to a minimum.

Results

In order to assess the operations of our mobility architecture into different scenarios, two simple testbeds were assembled, and both of them were evaluated in all the possible combinations of intra and inter-technology handovers between WAVE and Wi-Fi technology. The first testbed aims to evaluate how the mobility protocol reacts to the handover between access points which are at the same distance, in terms of hops, to the LMA; this is compared to a vehicle moving along a road performing handover between the available RSUs or Wi-Fi access points granting its occupants mobility (example scenario of FIG. 3). The second testbed aims to evaluate how the mobility protocol reacts to the handover between access points which are at a different number of connections from the LMA. This is compared to a vehicle moving along a road performing handover between the available RSUs or Wi-Fi access points, but also between other vehicles which are extending the range of those fixed infrastructures connection granting its occupants mobility (example scenario of FIG. 4). The setups comprised two OBUs and two RSUs, with both IEEE 802.11g and IEEE 802.11p technologies, composed by:

Single-board computer;
Debian Linux Squeeze, kernel: 2.6.32;
IEEE 802.11a/b/g/n interface;
IEEE 802.11p interface;

In all scenarios the IEEE 802.11p interfaces were configured with a bit rate of 12 Mbps in order to obtain a range of approximately 400 m in both RSUs and OBU. All results presented in this section were obtained through 10 handover repetitions in each scenario, and 95% confidence intervals are shown. The tests were carried out with a traffic rate of 512 Kbit/s between the LMA and a MNN, and with the vehicle, to which the MNN is connected, moving at a speed of approximately 70 km/h.

We performed experiments to evaluate the handover between both technologies, yielding the combinations described in Table I which shows the nomenclature used in the plots.

TABLE 1

Technology Handover Cases

| Name | Handover Case |
|---|---|
| P2P | IEEE 802.11p to IEEE 802.11p |
| P2G | IEEE 802.11p to IEEE 802.11g |
| G2P | IEEE 802.11g to IEEE 802.11p |
| G2G | IEEE 802.11g to IEEE 802.11g |
| G2G WS | IEEE 802.11g to IEEE 802.11g with previous scan |
| G2G W/O S | IEEE 802.11g to IEEE 802.11g without previous scan |

Figure 17:
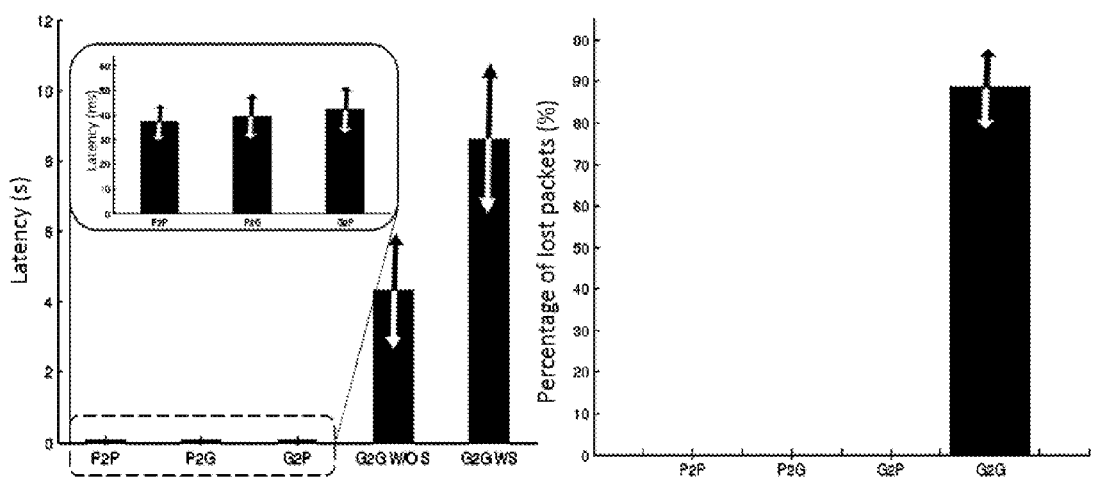
FIG. 17 shows a representation of the results of the real world evaluation of the mobility architecture with a scenario close to the one of the FIG. 3.

FIG. 17 shows the latency and the packet loss of the handover process between technologies in handovers between access points with the same number of hops to the LMA. It is clear that the IEEE 802.11g technology is not a mobility prepared technology for these environments, since it takes a longer time to perform the handover. As the mMAG shares the IEEE 802.11g physical interface with the network to which it is connected (input network), and also with the network that it broadcasts into the vehicle (output network), it even makes the process worse. This is caused by the scan procedure of the input network, which blocks the interface, resulting that the output network will be momentarily without connection. This translates in a larger packet loss in any handover procedure between an IEEE 802.11g.

If the handover is forced, it is then possible to perform the handover to an IEEE 802.11g network without doing a scan first reducing the connection lost time. The handover latency between IEEE 802.11g networks is larger when the scan is active than when it is inactive. With respect to the other handover cases, the best scenario is between IEEE 802.11p networks or from an IEEE 802.11g to an IEEE 802.11p network, since it does not require performing any scan on the IEEE 802.11g interface.

Notice that inter-technology handovers or handovers between IEEE 802.11p do not have losses, which is only possible due to IEEE 802.11p special characteristics such as fast registration and its ability to register in the next access point without having to disconnect from the previous one. Joining this with its higher range makes WAVE a much better technology to be applied on a vehicular environment.

Figure 18:
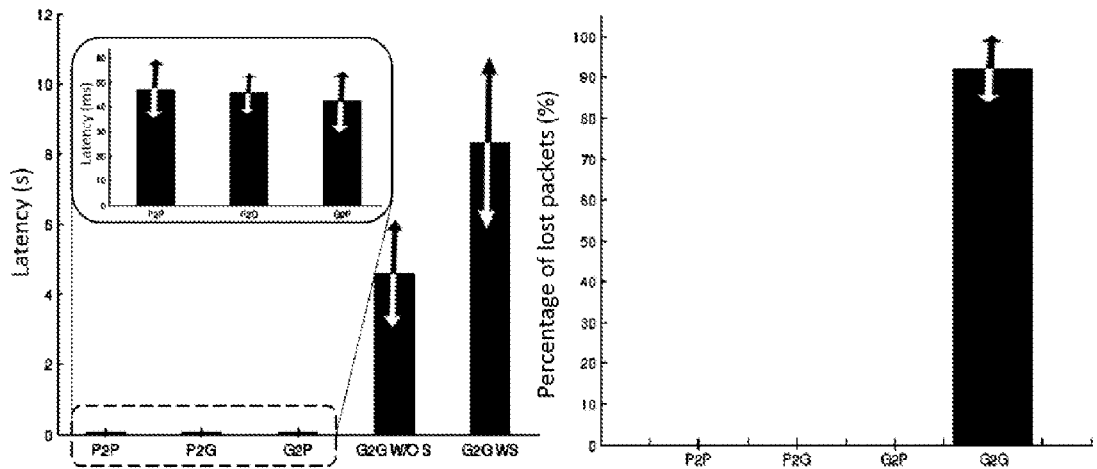
FIG. 18 shows a representation of the results of the real world evaluation of the mobility architecture with a scenario close to the one of the FIG. 4.
Figure 19A:
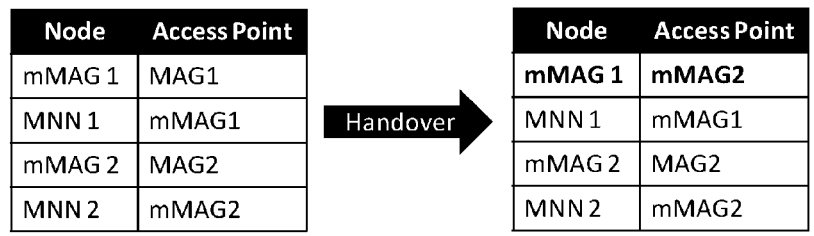
FIG. 19a shows a representation of the BCE cache of the LMA before and after the handover.
Figure 19B:
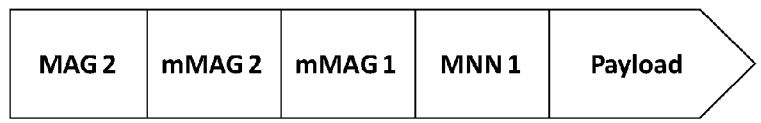
FIG. 19b shows a data packet, on exiting the LMA, wherein its packet encapsulation is such that the packet payload is routed through MAG2, mMAG2, mMAG1 and MNN1 on its way from the LMA to the MNN1.

FIG. 18 shows the latency and the packet loss of the handover process between technologies in handovers between access points at a different number of hops to the LMA. Once again, comparing the latency of the handover process between technologies, it is clear that the IEEE 802.11g technology keeps being the slowest one to perform handover. In fact, it is expected that the latency times remain approximately the same as on the testbed 1, since the only difference is that the mobility protocol control messages only have to travel one extra link, which is not supposed to affect the protocol speed significantly.

As can be seen the mobility protocol supported the nodes mobility between access points at a different number of hops which means that it is capable of supporting multi-hop handovers and therefore is now possible to extend the RSU coverage area through packets relay between the RSU and the mobile MAGs. This will improve quality service and reduce the need of fixed infrastructures.

The overall disclosure also includes the following embodiments.

It is disclosed an overall mobility architecture, including its protocols, mechanisms and algorithms, to be applied over vehicular networks in order to support IPv6 mobility of mobile nodes (for instance, vehicles and users) while moving between both Wi-Fi, cellular and WAVE technologies. The architecture is composed by:
  A Local Mobility Anchor (LMA), which is the central node of the architecture, being this node located on a network machine (for instance, server, desktop, cloud, etc.);
  A Mobile Access Gateway (MAG), which is a fixed infrastructure access point, that can be replicated in the architecture (for instance, Wi-Fi hotspots, Road Side Units, etc.);
  A mobile MAG (mMAG), which is a mobile access point inside a vehicle, that can be replicated in the architecture (for instance, personal vehicles, trucks, boats, etc.);
  A Mobile Network Node, which is an user device, that can be replicated in the architecture (for instance, smartphones, laptops, tablets, multimedia devices, etc.);
where the entities are connected as following:
  The LMA provides connection to the World Wide Web (WWW) and connects to the MAGs by wired links.
  The MAGs provide wireless networks to allow its users to connect to the backbone network. The wireless technologies available are IEEE 802.11a/b/g/n/p and 3G/LTE.
  The mMAGs allow extending the network by connecting to MAGs or other mMAGs providing Wi-Fi networks to its Users (MNNs) allowing them to access the WWW.
and comprise the following features:
  Support for multi-hop capabilities over mobile access points (mMAGs);
  IEEE 802.11a/b/g/n interface virtualization solution;
  Router Solicitation adaptation for compatibility with the IEEE 802.11p technology and IP tables configuration to handle Neighbor Solicitations;
  Support for partial IPv4 mobility over the IPv6 network managed by the developed mobility protocol;
  Connection Manager responsible by manage the available connections;

In an embodiment, the multi-hop capabilities is the use of chained access points interconnected in order to propagate a message from one end to the other allowing to extend the range to the fixed infrastructure.

In an embodiment, the use of virtual interfaces for use only one IEEE 802.11a/b/g/n interface to be able to broadcast an Wi-Fi network for the users within the vehicle as well as for connect to the available Wi-Fi connections on the surrounding infrastructures, therefore saving resources.

In an embodiment, the Router Solicitation message is sent explicitly to the destiny Link Local when the access technology is the IEEE 802.11p.

In an embodiment, the IP tables functionalities are used to block the unwanted neighbor solicitations when the technology in use is the IEEE 802.11p.

In an embodiment, the IPv4 support is based on an IPv4-in-IPv6 tunneling system and a NAP/NAPT server and it enables IPv4 users to access the backbone network and the internet by simply connect his device to the Wi-Fi network broadcasted by the vehicle. The users mobility is supported for the vehicle to which they are connected which allows them to keep connected and maintain their open sessions even when the car switches its attachment point.

In an embodiment, the first claim wherein the connection manager is an entity responsible for analyze and manage the available connections triggering the handover when needed.

In an embodiment, the connection manager analyses and connects to the best network available in each one of the supported technologies.

In an embodiment, the IEEE 802.11a/b/g/n technology, a new scanning and connection process is only started if there is no present active connection or if the present active connection RSSI is lower than a pre-set value.

In an embodiment, the IEEE 802.11p interface, every time a change of attachment point occurs a pre-set value of time must be waited before new scan and connection process. The scan for new networks is made periodically, and when a network with better conditions is detected the connection procedure is started.

The term Home Network Prefix identifies a part of a network address necessary to identify a network node or a sub-network at a network node. That part of the network address may usually be the beginning of the network address, or may not. The part of the network address may also be the full network address.

In an embodiment, the network addresses in the BCE data records are full-width network address records with a full-width address mask, such that any part or whole of a network address may be used.

The mobile nodes according to the disclosure (e.g. a MNN or a MMAG) may be vehicular nodes (e.g. a mobile node installed in a car), individual person nodes (e.g. a device carried by a person) or in another type of mobile placements.

In an embodiment, from the available connected networks, it is selected the interface which connection presents the best conditions, and the traffic is routed through that interface being the handover triggered every time that connection changes.

The term "comprising" whenever used in this document is intended to indicate the presence of stated features, integers, steps, components, but not to preclude the presence or addition of one or more other features, integers, steps, components or groups thereof.

Flow diagrams of particular embodiments of the presently disclosed methods are depicted in figures. The flow diagrams do not depict any particular means, rather the flow diagrams illustrate the functional information one of ordinary skill in the art requires to perform said methods required in accordance with the present disclosure.

It will be appreciated by those of ordinary skill in the art that unless otherwise indicated herein, the particular sequence of steps described is illustrative only and can be varied without departing from the disclosure. Thus, unless otherwise stated the steps described are so unordered meaning that, when possible, the steps can be performed in any convenient or desirable order.

It is to be appreciated that certain embodiments of the invention as described herein may be incorporated as code (e.g., a software algorithm or program) residing in firmware and/or on computer useable medium having control logic for enabling execution on a computer system having a computer processor, such as any of the servers described herein. Such a computer system typically includes memory storage configured to provide output from execution of the code which configures a processor in accordance with the execution. The code can be arranged as firmware or software, and can be organized as a set of modules, including the various modules and algorithms described herein, such as discrete code modules, function calls, procedure calls or objects in an object-oriented programming environment. If implemented using modules, the code can comprise a single module or a plurality of modules that operate in cooperation with one another to configure the machine in which it is executed to perform the associated functions, as described herein.

The disclosure is of course not in any way restricted to the embodiments described and a person with ordinary skill in the art will foresee many possibilities to modifications thereof.

The above described embodiments are obviously combinable.

The following claims further set out particular embodiments of the disclosure. Date: Jun. 24, 2014

The invention claimed is:

1. A system for providing data access to mobile network nodes of a digital data network, the system comprising:
   a local mobility anchor node ("LMA") having an uplink interface for connecting the digital data network to an upstream network;
   a plurality of mobility access gateways ("MAGs") configured as fixed infrastructure access points, each comprising a wired interface for communicating with the LMA;
   one or more mobile mobility access gateways ("mMAGs") configured as mobile access points, each comprising a wireless interface for communicating with the MAGs or other mMAGs; and
   a mobile network node ("MNN") comprising a wireless interface for communicating with the MAGs or mMAGs;
   wherein each of the mMAGs is configured by code to establish a network binding to the LMA, wherein each of the mMAGs, so configured, connects to an access point that is configured as a MAG or another mMAG, such that data packets received by the LMA are routed and forwarded to the MNN through the access point and the mMAG;
   wherein the LMA is configured by code to route and forward the received data packet to the MNN, wherein the LMA, so configured:
      identifies the MNN in Binding Cache Entry ("BCE") data records of the LMA and locating a respective access point in the data records; and
      where the respective access point is indicated as a non-mobile access point, determines that the respective access point is a fixed access point of the MNN and encapsulates or marks the packet for transport to the fixed access point;
      where the respective access point is indicated as a mobile access point, encapsulates or marks the packet for transport to the mobile access point and identifies, as a function of the BCE data records, a subsequent respective access point;
      where the subsequent access point is a non-mobile access point, determines that the subsequent access point is the fixed access point of the MNN and re-encapsulates or re-marks the packet by the LMA for transport to the fixed access point; and where the subsequent access point is a mobile access point, re-encapsulates or re-marks the packet for transport to the respective mobile access point and repeatedly identifies a further subsequent mobile access point as a function of the BCE data records to locate the fixed access point and, after the fixed access point is located, re-encapsulates or remarks the packet for transport to the fixed access point.

2. The system of claim 1 wherein the network binding between mMAG and the LMA is an IP tunnel, a VPN, a VLAN, or IP packet encapsulation.

3. The system of claim 1, wherein each mMAG further comprises a connection manager module configured by code to:

select the one of the available access points which said connection manager module considers in best communication conditions, and trigger a handover by the mMAG from any current access point to the selected access point, wherein the connection manager module is further configured for wireless access in vehicular environments, ("WAVE"), including access points, each requiring a predefined minimum of time before a new access point can be selected.

4. The system of claim 1, wherein the wireless interface between mMAG and MAG is a wireless access in vehicular environments, herewith WAVE, interface or a wireless local area network, herewith Wi-Fi, interface.

5. The system of claim 1, wherein the wireless interface between MNN and mMAG is a wireless local area network, herewith Wi-Fi, interface.

6. The system of claim 5, wherein the Wi-Fi wireless interfaces of the mMAG are virtual Wi-Fi interfaces of a physical Wi-Fi interface.

7. The system of claim 1, wherein the upstream network is the Internet or a network with Internet connectivity.

* * * * *